Patented Mar. 28, 1933

1,902,959

UNITED STATES PATENT OFFICE

ROBERT P. MYERS, OF BALTIMORE, MARYLAND, ASSIGNOR TO RESEARCH LABORATORIES OF NATIONAL DAIRY PRODUCTS CORPORATION, INC., OF BALTIMORE, MARYLAND, A CORPORATION OF MARYLAND

UNFERMENTED ACIDOPHILUS MILK

No Drawing. Application filed April 16, 1930. Serial No. 444,864.

This invention relates to an unfermented milk product containing *Lactobacillus acidophilus* and the process of preparing such an article. By *Lactobacillus acidophilus*, I mean the organism of this name which can be implanted in the intestinal tract and of which there are many species.

In view of the fact that the present commerical fermented acidophilus milk which is produced by culturing *Lactobacillus acidophilus* in skim milk is distasteful to many people who would like to drink such milk for its therapeutic value, a sweet unfermented acidophilus milk which would contain an effective dosage of viable lactobacilli and retain its efficacious characteristics and palatable taste over a reasonable period of time, is highly desirable.

The present invention contemplates an unfermented product of this character which will have the required keeping properties in that it may be prepared and delivered to consumers in accordance with usual practice from a central dairy station and wherein the quantity of viable lactobacilli will remain sufficiently large over a period of several days or more as to constitute a therapeutic effective dosage.

It is moreover an object of this invention to provide an unfermented product which may have admixed therewith, or in solution or suspension therein, a nutrient such as chocolate or milk concentrates of the character of malted milk, without in any wise affecting either the viability of the dosage or the keeping property of the beverage.

In carrying out the invention, skim milk from which the casein has been removed by curdling with rennet is the medium used for culturing the *Lactobacillus acidophilus*. A skim milk of good sanitary quality should be used. The skim milk is heated to 100° F. and sufficient rennet is added to produce a firm curd in about 15 minutes. The curd is cut and while the small curds are slowly stirred, the temperature is raised to about 135° F. After the whey has been drained off and filtered through cheese cloth, it is heated to 210°–212° F. and held at this temperature for at least one hour. The whey is left standing over night and the supernatant liquid siphoned off, the sediment being left in the bottom of the tank. The pH of this whey is approximately 6.0.

A vigorous culture of *Lactobacillus acidophilus* of proved therapeutic value, and recently isolated is the organism used. A starter or innoculum of *Lactobacillus acidophilus* is prepared by cultivating the organism in the whey culture medium described above or in one of the whey mediums to be later herein set forth. The starter, after it has been incubated sixteen to twenty-four hours at 37° to 40° C. is added to the main batch of whey. The amount of the starter to be used is from 2 to 10% by volume. The batch is thoroughly mixed and is held at 37° C. to 40° C. for sixteen to twenty-four hours. The *Lactobacillus acidophilus* at the end of this time are present in a concentration of from 300 to 400 million per cubic centimeter. In order to avoid contamination, extreme care must be exercised to handle the cultures aseptically.

At the end of the incubation period, the culture is run through a continuous flow centrifuge operated at such a speed that substantially 99+% of the *Lactobacillus acidophilus* is removed from the culture medium and deposited on the bowl of the centrifuge.

The centrifugate consisting of *Lactobacillus acidophilus* is carefully scraped from the bowl and is resuspended in boiled water for example boiled tap water, isotonic salt solution or other sterilized liquid medium such as sterilized diluted skim milk or sterilized diluted whey by vigorous agitation. The mixture is centrifugalized as above, the centrifuge being run at such a speed that substantially 99.+% of the *Lactobacillus acidophilus* is removed in the form of a concentrate from the wash water. The handling of the culture and the centrifuge must be done in such a way that the material is not contaminated.

As an alternate procedure to the resuspension of the centrifugate in boiled water, or the other mediums above mentioned, for purposes of washing out the acid, I can accomplish the same result by diluting the original whey culture medium preferably with an equal volume of previously boiled and cooled tap water, although one of the other mediums referred to can be used, neutralizing the diluted culture whey to a pH of about 6.3 and then centrifugalizing. The occluded acid in the centrifugate is so neutralized and diluted that this treatment yields a centrifugate comparable in quality to the concentrate obtained by resuspension and recentrifugation.

In order to reduce the amount of insoluble material as well as to stimulate growth of the Lactobacilli in the whey medium or the whey medium to which has been added one of the nutrients to be hereinafter described, and thus increase the amount of the centrifugate obtained by centrifugalizing the *Lactobacillus acidophilus* culture, I have found that an enzyme such as pepsin, tripsin, papain and others may be added to the whey medium and allowed to act on the protein before the whey medium is sterilized. For example, in peptic digestion, the whey medium is made acid by the addition of hydrochloric acid, although sulfuric and lactic acids may also be employed and a pH of about 3.4 established. The medium is held at a temperature of about 47° to 50° C. for approximately two hours to allow the pepsin to digest the troublesome protein material which otherwise precipitates as the culture grows. The medium is then neutralized with sodium hydroxide, calcium hydroxide or potassium hydroxide to a pH of about 6.4 and sterilized by heating to destroy the enzyme and to prepare a sterile medium for the growth of the culture. The amount of pepsin to be used will vary with the batch under treatment, but I have found amounts ranging between 1 and 10 parts in 100,000 parts of the medium to be satisfactory. By this means, as stated, I am able to reduce the amount of insoluble material more than 50% and the concentration of the Lactobacilli per gram of centrifugate is proportionately increased. That is to say, the stimulated growth and elimination of insoluble matter proceeds to such a degree that the increase in count of Lactobacillus per gram of centrifugate reaches 2 or 3 times and more, over a method where preliminary digestion and sterilization are not resorted to. For example, a gram of centrifugate prepared by this method will contain at least fifty billion viable Lactobacilli.

It will be understood that the centrifugates or concentrates obtained by either of the two methods referred to and either produced from a diluted whey medium as described or resuspended as also set forth constitutes the product which is to be added to the milk.

The various concentrates and centrifugates referred to above, which, as stated, are recovered in a highly purified condition, enable the milk to be advantageously produced, since they are free of acids, insoluble matter, i. e., by-products of growth, as well as substances tending to produce a taint or off-flavor. In other words, the concentrates and centrifugates, by reason of their purity, can be combined with the milk while maintained at a low temperature, e. g., below 50° F., as described herein, without fear of producing souring of the milk. That is, there will be no objectionable presence of undesired organisms, or chemical action which will aid the formation of lactic acid and other undesirable compounds.

An excellent quality of raw milk should be selected and pasteurized preferably so as to render it as nearly sterile as possible without giving it a cooked flavor. A temperature of 160° F. for half an hour is probably the most satisfactory. The milk is immediately thereafter cooled to below 50° F.

The centrifugate produced as above is suspended in the raw milk or the whole milk pasteurized as in the preceding paragraph by vigorous agitation and preferably followed by homogenization at a pressure below 1500 but which may reach 2000 pounds. During this process, the milk is kept below 50° F. and after the completion of the suspending operation, the product is preferably just below 50° F. In other words, the milk or milk product is maintained at a temperature to prevent souring of the milk. Where the temperature is not maintained at a sufficiently low point, the growth of the organisms will result, producing lactic acid and acting to sour the milk. By maintaining a sufficiently low temperature, growth of the organisms is inhibited and the formation of lactic acid obviated.

The finished product at the time of manufacture should contain about three hundred million to five hundred million viable Lactobacilli per cubic centimeter of milk, so as to insure that even after the beverage has been held for forty-eight hours or longer, the count per cubic centimeter will be above the minimum effective dosage, in that it will still have uniformly more than two hundred million viable Lactobacilli per cubic centimeter of milk. This proportion of two hundred million Lactobaccilli per cubic centimeter of milk has been described by medical authorities as the minimum therapeutically effective dosage. By dosage, is meant, of course, that each cubic centimeter of the milk contains at least the prescribed minimum count.

In order to produce a quart of milk containing five hundred million viable *Lactobacillus acidophilus* per cc. approximately one and one-half to two quarts of the whey culture will be required, if it be assumed recovery is 99 + % efficient and that the culture contained three hundred million to five hundred million viable *Lactobacillus acidophilus* per cubic centimeter of culture. The weight of the semi-solid centrifugate or concentrate to be added to a quart of milk to give the desired count per cubic centimeter will vary and depend on the yield of Lactobacilli obtained in the culture. This yield is influenced by the condition of the medium which, in accordance with this invention, can be enhanced by the steps of preliminary enzymic digestion and sterilization, as well as by treatment or modification with additive agents or nutrients to be later described.

It will be understood that in the use of the process embodying enzymic digestion, the concentration of Lactobacilli in the centrifugate will be increased to such an extent that I have obtained as high as eight hundred million viable Lactobacilli per gram of centrifugate. The centrifugate is thus in high concentrated form and substantially pure, being free from acids, neutralizers and other undesirable flavors and insoluble matter. Such centrifugate in proportionately smaller quantities can be added to a large mass of milk and accomplish the same result where a less purified centrifugate which must be added in a larger quantity is employed. This is due to the fact that the more completely concentrated centrifugate is free from any deleterious substances which would affect the milk, whereas with less purified centrifugates which are less concentrated, there is always the danger of contamination and the quantity of centrifugate added must be proportionately high to maintain the desired count of viable Lactobacilli.

In lieu of preparing the whey culture as above set forth, I employ a suitable whey powder, preferably rennet whey powder, and reconstitute with sufficient water to provide a culture medium of desired concentration. The concentration may, of course, be varied, but I have found that a range up to 10% of the whey powder will provide an excellent culture medium. Preferably, a concentration between 3% and 6% will give very satisfactory results.

The hydrogen ion concentration of the culture medium should be about pH 6.0 to pH 6.5.

I have, moreover, found that malt syrup of which there are many commercial varieties available, will, when added to the whey culture medium either obtained from the skim milk or from the reconstituted powder, produce a rapid and vigorous growth of the *Lactobacillus acidophilus*. The addition of the malt syrup accelerates the yield to a considerable degree.

Where necessary the malt syrup is previously neutralized so as to produce when added to the whey medium a hydrogen ion concentration having the value of pH 6.0 to pH 6.5. It may also be suitably diluted when required.

On the other hand, the syrup in diluted or undiluted condition may be added to the whey culture medium and the mixture thereafter neutralized to give the desired pH.

In the case of the whey medium, the speed and vigor of the growth and the yield will, of course, vary with the richness or concentration of the medium, and I have found that the growth and yield when the syrup is employed is likewise rapid and augmented in accordance with the amount of syrup added to the whey medium.

The carbohydrate nutrient will be added in the quantity required, which may range up to as high as 10%. Preferably, a whey, malt syrup culture medium in which the concentration of the syrup is about 3% will suffice in most cases to produce the desired accelerated growth and yield. It will be understood that this concentration will be increased or decreased dependent upon various conditions as for example upon the concentration and richness of the particular whey medium.

It has been found that within the sixteen to twenty-four hour period allotted for incubation there has resulted from the addition of the syrup, an increased yield of Latobacillus indicating that the syrup produces a more vigorous and rapid growth.

The innoculum is added to the several mediums produced as above and allowed to incubate under the same conditions heretofore recited. At the end of the incubation period, the Lactobacilli are segregated and washed by means of a centrifuge or filter press, or by means of both as hereinbefore alluded to.

It will be understood that the innoculum or starter may be initially cultivated in either of the several mediums described, namely the whey medium from skim milk, the reconstituted whey medium from dehydrated whey, or either of these mediums to which has been added an appropriate amount of malt syrup or other nutrient. In other words, the bacilli may thus become previously acclimated by cultivating in any one of these mediums which will induce a better growth and yield when the innoculum is later introduced into the particular culture medium and incubated.

The milk possesses the advantage that it will have a pleasant taste to anyone to whom milk as such is not unpalatable and notwithstanding the latter condition, the beverage can be admixed or provided with other nutrients to suit a particular taste. Moreover, by the method herein outlined, the preparation can be more carefully controlled. In other words, the use of sterile medium and pure culture eliminate the danger of contamination and essentially aid in assisting the keeping qualities of the product.

Another advantage of the unfermented *Lactobacillus acidophilus* milk resides in the fact that the original lactose content of the milk is present in the sweet milk and has not been fermented into acid. The lactose is of value in maintaining the predominant acidophilus flora. It is even possible to make the milk more beneficial for certain pathological conditions by the addition of an excess of lactose in controlled predetermined amounts. In other words, it is desirable to have present in the milk a lactose content which is sufficient to aid the implantation of the flora in the intestinal tract. As stated, the lactose may be present in amount in the milk to secure this result, or additional lactose may be added, but the amount should not be less than that in the original milk.

The centrifugate or concentrate above referred to in compressed form or as removed from a filter press, may be commercially distributed by wrapping in tin foil or other suitable container or wrapper such as a soluble or insoluble capsule, whereby fresh dosages of viable Lactobacilli will be available daily. This is possible since the centrifugate freed from the washing fluid has been found to have a remarkable degree of purity, substantially free from acids and undesirable flavors or taints, i. e., by-products of growth. In this connection, it will be observed that the centrifugates and concentrates are prepared in such a purified state that they may be suspended in the milk without fear of producing souring while the milk is retained at a low temperature.

In connection with the unfermented milk product containing Lactobacillus acidophilus, I have found that the addition of various nutrients such as chocolate will have no ill effect upon the keeping qualities. Moreover, a nutrient such as milk concentrates in the nature of powdered malted milk has been found very effective without affecting the viability of the Lactobacilli or the keeping properties of the beverage. As previously stated, these may be suitably admixed with the acidophilus milk either prior to or after the Lactobacilli have been suspended in the milk, and may exist in solution or in suspension therein, being added in either fluid or powdered form.

The unfermented milk product containing Lactobacillus acidophilus and with or without such additional nutrients is of milk-like consistency and readily palatable.

It will, moreover, be understood that in the process of culturing, the whey constitutes the culture medium and the acid is neutralized or washed from the centrifugate before it is added to the sweet milk. In this manner, it will be clear that the keeping qualities of the unfermented milk, as well as that of the Lactobacilli will be maintained for relatively long periods which is, of course, of prime importance where the milk is supplied by daily delivery to consumers in the usual manner from a central dairy, or where daily distribution of fresh Lactobacilli in wrapped or capsule form is contemplated.

The centrifuge employed may be relatively large, for plant operation one such as Sharples super-centrifuge being found desirable. In addition a filter press may be utilized in some cases or a combination centrifugal separator and filter press will be found advantageous.

The substantially pure centrifugate produced as herein outlined can be admirably admixed with cream or cottage cheese and sold in this form commercially. The product will be relatively long keeping since the cheese will maintain the Lactobacilli viable.

In addition to the malt syrup above mentioned, I may use other nutrients such as the extracts or syrups from malted grains as barley and rye, also maltose, malt sugar, crude molasses (beet or cane), dextrin, glucose and galactose.

In referring herein to resuspension of the centrifugate to form a concentrate, it will, of course, be understood that this will be resorted to where dilution is not desirable.

What I claim is:

1. A sweet unfermented *Lactobacillus acidophilus* milk of milk-like consistency, and comprising sweet milk and *Lactobacillus acidophilus* present in numbers to give a therapeutically effective product.

2. A sweet unfermented *Lactobacillus acidophilus* milk of milk-like consistency, and comprising sweet milk and *Lactobacillus acidophilus* present in numbers to give a therapeutically effective product, the *Lactobacillus acidophilus* being substantially free of any substances active to produce souring at temperatures below 50° F.

3. A sweet unfermented *Lactobacillus acidophilus* milk of substantially milk-like consistency and comprising a sweet milk product and *Lactobacillus acidophilus* present in numbers to give a therapeutically effective product.

4. The process of preparing *Lactobacillus acidophilus* milk which comprises adding to sweet milk while maintained at a temperature below 50° F., *Lactobacillus acidophilus* in numbers to give a therapeutically effective product and substantially free of any substances active to sour the milk below 50° F., and agitating the mass while held at a temperature below 50° F. to produce a suspension of *Lactobacillus acidophilus* in the milk.

5. The process of preparing *Lactobacillus acidophilus* milk which comprises adding to sweet milk while maintained at a temperature below 50° F., *Lactobacillus acidophilus* in numbers to give a therapeutically effective product and substantially free of any substances active to sour the milk below 50° F., and homogenizing the mass while held at a temperature below 50° F. to suspend the *Lactobacillus acidophilus* in the milk.

6. The process of obtaining *Lactobacillus acidophilus* milk of milk-like consistency which comprises culturing *Lactobacillus*

*acidophilus* in a suitable medium, recovering the *Lactobacillus acidophilus* in substantially pure condition free of substances active to sour the milk below 50° F., and suspending the purified concentrate so obtained in a sweet unfermented milk in sufficient numbers of living cells to give a therapeutically effective product and at a temperature below 50° F.

7. A sweet unfermented *Lactobacillus acidophilus* milk of milk-like consistency and comprising sweet milk, lactose present in amount not substantially less than the original lactose content of the milk, and *Lactobacillus acidophilus* suspended in the milk and present in numbers to give a therapeutically effective product.

8. The process of preparing a *Lactobacillus acidophilus* milk product of substantially milk-like consistency which comprises adding to a sweet milk product while maintained at a temperature below 50° F., *Lactobacillus acidophilus* in numbers to give a therapeutically effective product and substantially free of any substances active to sour the milk below 50° F. and agitating the mass while held at a temperature below 50° F. to produce a suspension of *Lactobacillus acidophilus* in the milk.

9. The process of preparing Lactobacillus milk which comprises adding to sweet milk *Lactobacillus acidophilus* in numbers to give a therapeutically effective product and maintaining the milk at a temperature sufficiently low to inhibit growth of the organisms and formation of lactic acid and prevent souring of the milk.

10. The process of preparing a *Lactobacillus acidophilus* milk product which comprises adding to a sweet milk product *Lactobacillus acidophilus* in numbers to give a therapeutically effective product and maintaining the milk product at a temperature sufficiently low to inhibit growth of the organisms and formation of lactic acid and prevent souring of the milk.

11. The process of making sweet acidophilus milk which comprises suspending *Lactobacillus acidophilus* in the milk in numbers to be therapeutically effective by adding the Lactobacillus and subjecting the mixture to agitation, and maintaining the temperature sufficiently low to inhibit growth of the organisms and formation of lactic acid and prevent souring of the milk.

12. A sweet unfermented *Lactobacillus acidophilus* milk of milk-like consistency and comprising sweet pasteurized and homogenized milk and *Lactobacillus acidophilus* present in numbers to give a therapeutically effective product.

13. A sweet unfermented *Lactobacillus acidophilus* milk of milk-like consistency and comprising pasteurized sweet milk and *Lactobacillus acidophilus* present in numbers to give a therapeutically effective product, the Lactobacillus being added to the milk substantially free of any substances active to sour the milk at a low temperature.

In testimony whereof I have hereunto set my hand.

ROBERT P. MYERS.